(12) United States Patent
Claus et al.

(10) Patent No.: US 11,094,004 B2
(45) Date of Patent: Aug. 17, 2021

(54) SYSTEM AND METHOD FOR APPORTIONING TRADING ORDERS BASED ON SIZE OF DISPLAYED QUANTITIES

(71) Applicant: BGC Partners, Inc., New York, NY (US)

(72) Inventors: Matthew W. Claus, Summit, NJ (US); Kevin M. Foley, New York, NY (US); Joseph C. Noviello, Summit, NJ (US); Howard W. Lutnick, New York, NY (US)

(73) Assignee: ESPEED, INC., New York, NY (US)

( * ) Notice: Subject to any disclaimer, the term of this patent is extended or adjusted under 35 U.S.C. 154(b) by 109 days.

(21) Appl. No.: 16/516,323

(22) Filed: Jul. 19, 2019

(65) Prior Publication Data

US 2019/0340682 A1 Nov. 7, 2019

Related U.S. Application Data

(63) Continuation of application No. 13/936,789, filed on Jul. 8, 2013, now Pat. No. 10,395,310, which is a
(Continued)

(51) Int. Cl.
*G06Q 40/00* (2012.01)
*G06Q 40/04* (2012.01)

(52) U.S. Cl.
CPC .............. *G06Q 40/00* (2013.01); *G06Q 40/04* (2013.01)

(58) Field of Classification Search
CPC ................................ G06Q 40/00; G06Q 40/04
See application file for complete search history.

(56) References Cited

U.S. PATENT DOCUMENTS

| 3,573,747 A | 4/1971 | Adams et al. |
| 3,581,072 A | 5/1971 | Nymeyer |

(Continued)

FOREIGN PATENT DOCUMENTS

| AU | 2008/200781 | 3/2008 |
| EP | 0388162 | 3/1990 |

(Continued)

OTHER PUBLICATIONS

U.S. Appl. No. 12/945,046, filed Nov. 2010, Daley et al.
(Continued)

*Primary Examiner* — Scott S Trotter

(57) ABSTRACT

An apparatus for processing trading orders comprises a memory and a processor. The memory stores a first order and a second order. The first order is associated with a product and comprises a displayed quantity and a reserved quantity. The second order is associated with the product and comprises a displayed quantity and a reserved quantity. The processor is coupled to the memory and receives a counterorder associated with the product. The processor fills the displayed quantity of the first order with a corresponding portion of the counterorder, and fills the displayed quantity of the second order with a corresponding portion of the counterorder. The processor allocates a first additional portion of the counterorder to the first order. The first additional portion is based at least in part on a ratio of the displayed quantity of the first order to a sum of the displayed quantity of the first order and the displayed quantity of the second order.

20 Claims, 2 Drawing Sheets

Related U.S. Application Data continuation of application No. 11/499,496, filed on Aug. 3, 2006, now Pat. No. 8,484,122.

(60) Provisional application No. 60/705,769, filed on Aug. 4, 2005.

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 5,077,665 A | 12/1991 | Silverman et al. |
| 5,101,353 A | 3/1992 | Lupien et al. |
| 5,136,501 A | 8/1992 | Silverman et al. |
| 5,297,031 A | 3/1994 | Gutterman et al. |
| 5,305,200 A | 4/1994 | Hartheimer et al. |
| 5,375,055 A | 12/1994 | Togher et al. |
| 5,717,989 A | 2/1998 | Tozzoli et al. |
| 5,727,165 A | 3/1998 | Ordish et al. |
| 5,787,402 A | 7/1998 | Potter et al. |
| 5,794,207 A | 8/1998 | Walker et al. |
| 5,873,071 A | 2/1999 | Ferstenberg et al. |
| 5,915,245 A | 6/1999 | Patterson, Jr. et al. |
| 5,924,083 A | 7/1999 | Silverman et al. |
| 5,930,762 A | 7/1999 | Masch |
| 5,950,177 A | 9/1999 | Lupien et al. |
| 5,970,479 A | 10/1999 | Shepherd |
| 6,012,046 A | 1/2000 | Lupien et al. |
| 6,014,643 A | 1/2000 | Minton |
| 6,029,146 A | 2/2000 | Hawkins et al. |
| 6,058,379 A | 5/2000 | Odom |
| 6,098,051 A | 8/2000 | Lupien et al. |
| 6,112,181 A | 8/2000 | Shear |
| 6,141,653 A | 10/2000 | Conklin et al. |
| 6,173,270 B1 | 1/2001 | Cristofich et al. |
| 6,236,972 B1 | 5/2001 | Shkedy |
| 6,247,000 B1 | 6/2001 | Hawkins et al. |
| 6,278,982 B1 | 8/2001 | Korhammmer et al. |
| 6,285,989 B1 | 9/2001 | Shoham |
| 6,393,409 B2 | 5/2002 | Young et al. |
| 6,405,180 B2 | 6/2002 | Tilfors et al. |
| 6,408,282 B1 | 6/2002 | Buist |
| 6,418,419 B1 | 7/2002 | Nieboer et al. |
| 6,421,653 B1 | 7/2002 | May |
| 6,505,175 B1 | 1/2003 | Silverman et al. |
| 6,519,571 B1 | 2/2003 | Guheen |
| 6,532,460 B1 | 3/2003 | Amanat et al. |
| 6,536,935 B2 | 3/2003 | Parunak et al. |
| H2064 H | 5/2003 | Buchalter |
| 6,601,044 B1 | 7/2003 | Wallman |
| 6,606,744 B1 | 8/2003 | Mikurak |
| 6,615,188 B1 | 9/2003 | Breen et al. |
| 6,618,707 B1 | 9/2003 | Gary |
| 6,629,082 B1 | 9/2003 | Hambrecht et al. |
| 6,731,729 B2 | 5/2004 | Eng et al. |
| 6,772,132 B1 | 8/2004 | Kemp, II et al. |
| 6,829,589 B1 | 12/2004 | Saliba |
| 6,847,934 B1 | 1/2005 | Lin et al. |
| 6,871,191 B1 | 3/2005 | Kinney, Jr. et al. |
| 6,909,941 B2 | 6/2005 | Scott et al. |
| 6,938,011 B1 | 8/2005 | Kemp, II et al. |
| 6,963,856 B2 | 11/2005 | Lutnick et al. |
| 6,983,011 B1 | 1/2006 | Hara et al. |
| 6,983,260 B2 | 1/2006 | Hummelgren |
| 7,035,819 B1 | 4/2006 | Gianakouros et al. |
| 7,035,820 B2 | 4/2006 | Goodwin et al. |
| 7,058,602 B1 | 6/2006 | La Mura et al. |
| 7,110,969 B1 | 9/2006 | Bennett et al. |
| 7,110,975 B2 | 9/2006 | Marks de Chabris et al. |
| 7,113,924 B2 | 9/2006 | Fishbain |
| 7,127,424 B2 | 10/2006 | Kemp, II et al. |
| 7,152,037 B2 | 12/2006 | Smith |
| 7,162,447 B1 | 1/2007 | Cushing |
| 7,181,419 B1 | 2/2007 | Mesaros |
| 7,197,483 B2 | 3/2007 | Brady et al. |
| 7,209,896 B1 | 4/2007 | Serkin et al. |
| 7,213,000 B2 | 5/2007 | Gutierrez et al. |
| 7,231,363 B1 | 6/2007 | Hughes et al. |
| 7,242,669 B2 | 7/2007 | Bundy et al. |
| 7,246,092 B1 * | 7/2007 | Peterson ............... G06Q 20/10 705/35 |
| 7,277,868 B2 | 10/2007 | Terashima |
| 7,310,620 B2 | 12/2007 | Moore et al. |
| 7,330,834 B1 | 2/2008 | LaPierre |
| 7,383,220 B1 | 6/2008 | Keith |
| 7,386,497 B1 | 6/2008 | Gooch |
| 7,392,214 B1 | 6/2008 | Fraser et al. |
| 7,401,044 B1 | 7/2008 | Fraser et al. |
| 7,483,850 B1 | 1/2009 | Fishbain |
| 7,536,338 B2 | 5/2009 | Guler et al. |
| 7,571,132 B2 | 8/2009 | Cole |
| 7,574,395 B2 | 8/2009 | Sweeting |
| 7,587,346 B2 | 9/2009 | Malitzis |
| 7,653,584 B2 | 1/2010 | Schmitz et al. |
| 7,693,775 B2 | 4/2010 | Korhammer |
| 7,769,652 B1 | 8/2010 | Monroe |
| 7,818,191 B2 | 10/2010 | Lutnick |
| 7,835,987 B2 | 11/2010 | Daley et al. |
| 7,840,477 B2 | 11/2010 | Claus et al. |
| 7,979,339 B2 | 7/2011 | Claus et al. |
| 8,407,116 B1 | 3/2013 | Serkin |
| 8,463,649 B2 | 6/2013 | Lutnick et al. |
| 8,484,122 B2 | 7/2013 | Claus et al. |
| 8,494,951 B2 | 7/2013 | Claus et al. |
| 8,566,213 B2 | 10/2013 | Sweeting |
| 8,583,540 B2 | 11/2013 | Claus |
| 8,599,213 B2 | 12/2013 | DiVerdi et al. |
| 8,666,858 B2 | 3/2014 | Kemp et al. |
| 8,738,498 B2 | 5/2014 | Daley et al. |
| 9,805,417 B2 | 10/2017 | Kemp, II et al. |
| 10,304,097 B2 | 5/2019 | Daley |
| 10,395,310 B2 | 8/2019 | Claus |
| 10,424,015 B2 | 9/2019 | Claus |
| 2001/0037284 A1 | 11/2001 | Finkelstein et al. |
| 2001/0042040 A1 | 11/2001 | Keith |
| 2001/0049651 A1 | 12/2001 | Selleck |
| 2001/0051909 A1 | 12/2001 | Keith |
| 2001/0056396 A1 | 12/2001 | Goino |
| 2002/0010672 A1 | 1/2002 | Waelbroeck et al. |
| 2002/0016758 A1 | 2/2002 | Grigsby |
| 2002/0023037 A1 | 2/2002 | White, Jr. |
| 2002/0046127 A1 | 4/2002 | Reding et al. |
| 2002/0052822 A1 | 5/2002 | Terashima |
| 2002/0052827 A1 | 5/2002 | Waelbrock et al. |
| 2002/0055901 A1 | 5/2002 | Gianakouros et al. |
| 2002/0073016 A1 * | 6/2002 | Furbush ............ G06Q 30/0627 705/37 |
| 2002/0087451 A1 | 7/2002 | Rieger et al. |
| 2002/0091606 A1 | 7/2002 | Shapiro |
| 2002/0091617 A1 | 7/2002 | Keith |
| 2002/0099640 A1 | 7/2002 | Lange |
| 2002/0108141 A1 | 8/2002 | Kang et al. |
| 2002/0120546 A1 | 8/2002 | Zajac |
| 2002/0156719 A1 | 10/2002 | Finebaum et al. |
| 2002/0169703 A1 | 11/2002 | Lutnick et al. |
| 2002/0178104 A1 | 11/2002 | Hausman |
| 2002/0188548 A1 | 12/2002 | Bunda |
| 2002/0198816 A1 | 12/2002 | Gilbert et al. |
| 2003/0004858 A1 | 1/2003 | Schmitz et al. |
| 2003/0009411 A1 | 1/2003 | Ram et al. |
| 2003/0009412 A1 | 1/2003 | Furbush et al. |
| 2003/0009413 A1 | 1/2003 | Furbush et al. |
| 2003/0014351 A1 | 1/2003 | Neff et al. |
| 2003/0093343 A1 | 5/2003 | Huttenlocher et al. |
| 2003/0097325 A1 | 5/2003 | Friesen et al. |
| 2003/0101128 A1 | 5/2003 | Abernethy |
| 2003/0101130 A1 | 5/2003 | Cliff |
| 2003/0126065 A1 | 7/2003 | Eng |
| 2003/0149636 A1 | 8/2003 | Lutnick et al. |
| 2003/0149661 A1 | 8/2003 | Mitchell et al. |
| 2003/0167224 A1 | 9/2003 | Periwal |
| 2003/0172024 A1 | 9/2003 | Kokis et al. |
| 2003/0177082 A1 | 9/2003 | Buckwalter |
| 2003/0177085 A1 | 9/2003 | Buckwalter et al. |
| 2003/0177086 A1 | 9/2003 | Gomber et al. |

(56) References Cited

U.S. PATENT DOCUMENTS

| | | |
|---|---|---|
| 2003/0216932 A1 | 11/2003 | Foley |
| 2003/0220867 A1 | 11/2003 | Goodwin et al. |
| 2003/0225646 A1 | 12/2003 | Failla et al. |
| 2003/0225674 A1 | 12/2003 | Hughes et al. |
| 2003/0229557 A1 | 12/2003 | Richmann et al. |
| 2003/0229569 A1 | 12/2003 | Nalbandian et al. |
| 2003/0236729 A1 | 12/2003 | Epstein et al. |
| 2003/0236737 A1 | 12/2003 | Kemp, II |
| 2004/0019551 A1 | 1/2004 | Martyn et al. |
| 2004/0024684 A1 | 2/2004 | Montepeque |
| 2004/0034591 A1 | 2/2004 | Waelbroeck et al. |
| 2004/0059666 A1 | 3/2004 | Waelbroeck et al. |
| 2004/0093296 A1 | 5/2004 | Phelan et al. |
| 2004/0103054 A1 | 5/2004 | Singer |
| 2004/0133526 A1 | 7/2004 | Shmueli et al. |
| 2004/0143538 A1 | 7/2004 | Korhammer et al. |
| 2004/0143542 A1 | 7/2004 | Magill et al. |
| 2004/0172337 A1 | 9/2004 | Spoonhower |
| 2004/0177024 A1 | 9/2004 | Bok et al. |
| 2004/0193496 A1 | 9/2004 | Hirota |
| 2004/0193596 A1 | 9/2004 | Defelice et al. |
| 2004/0210505 A1 | 10/2004 | Pourhamid |
| 2004/0210511 A1 | 10/2004 | Waelbroeck et al. |
| 2004/0210512 A1 | 10/2004 | Fraser et al. |
| 2004/0210514 A1 | 10/2004 | Kemp et al. |
| 2004/0215538 A1 | 10/2004 | Smith et al. |
| 2004/0236636 A1 | 11/2004 | Lutnick et al. |
| 2004/0236662 A1 | 11/2004 | Korhammer et al. |
| 2004/0254804 A1 | 12/2004 | Peterffy et al. |
| 2005/0015323 A1 | 1/2005 | Myr |
| 2005/0017710 A1 | 1/2005 | Steinich et al. |
| 2005/0027635 A1 | 2/2005 | Monroe et al. |
| 2005/0044031 A1 | 2/2005 | Lebedev |
| 2005/0055304 A1 | 3/2005 | Lutnick et al. |
| 2005/0055305 A1 | 3/2005 | Lutnick et al. |
| 2005/0075898 A1 | 4/2005 | Wasserman et al. |
| 2005/0091142 A1 | 4/2005 | Renton |
| 2005/0119966 A1 | 6/2005 | Sandholm et al. |
| 2005/0125326 A1 | 6/2005 | Nangalia et al. |
| 2005/0125329 A1 | 6/2005 | Gerhart |
| 2005/0154630 A1 | 7/2005 | Lin et al. |
| 2005/0160032 A1 | 7/2005 | Lutnick et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0222936 A1 | 10/2005 | Panariti et al. |
| 2005/0289043 A1 | 12/2005 | Maudlin |
| 2006/0015436 A1 | 1/2006 | Burns et al. |
| 2006/0015441 A1 | 1/2006 | Burkhardt et al. |
| 2006/0026090 A1 | 2/2006 | Balabon |
| 2006/0059079 A1 | 3/2006 | Howorka |
| 2006/0080222 A1 | 4/2006 | Lutnick et al. |
| 2006/0085319 A1 | 4/2006 | Nangalia et al. |
| 2006/0136318 A1 | 6/2006 | Rafieyan et al. |
| 2006/0149662 A1 | 7/2006 | Nordlicht et al. |
| 2006/0190386 A1 | 8/2006 | Levy |
| 2006/0218071 A1 | 9/2006 | Sweeting |
| 2006/0253379 A1 | 11/2006 | Adcock et al. |
| 2006/0253381 A1 | 11/2006 | Adcock et al. |
| 2006/0253382 A1 | 11/2006 | Adcock et al. |
| 2006/0253882 A1 | 11/2006 | Adcock et al. |
| 2006/0259404 A1 | 11/2006 | Brumfield et al. |
| 2006/0277136 A1 | 12/2006 | O'Connor et al. |
| 2006/0277137 A1 | 12/2006 | Claus et al. |
| 2007/0005481 A1 | 1/2007 | Kedia et al. |
| 2007/0005484 A1 | 1/2007 | Waelbroeck et al. |
| 2007/0100734 A1 | 5/2007 | Berger et al. |
| 2007/0118464 A1 | 5/2007 | Avery |
| 2007/0130048 A1 | 6/2007 | Claus et al. |
| 2007/0130050 A1 | 6/2007 | Claus et al. |
| 2007/0156574 A1 | 7/2007 | Marynowski et al. |
| 2007/0156754 A1 | 7/2007 | Busch et al. |
| 2007/0174179 A1 | 7/2007 | Avery |
| 2007/0219898 A1 | 9/2007 | Burkhardt et al. |
| 2008/0015974 A1 | 1/2008 | Balabon |
| 2008/0097893 A1 | 4/2008 | Walsky et al. |
| 2008/0319891 A1 | 12/2008 | Scheinberg et al. |
| 2011/0029335 A1 | 2/2011 | Lutnick et al. |
| 2011/0071937 A1 | 3/2011 | Claus et al. |
| 2011/0270736 A1 | 11/2011 | Claus et al. |
| 2012/0123925 A1 | 5/2012 | Daley |
| 2012/0209758 A1 | 8/2012 | Adcock et al. |
| 2013/0185185 A1 | 7/2013 | Tilly et al. |
| 2013/0304625 A1 | 11/2013 | Claus et al. |
| 2014/0089018 A1 | 3/2014 | Lutnick et al. |
| 2019/0311411 A1 | 10/2019 | Daley et al. |
| 2019/0340682 A1 | 11/2019 | Claus |
| 2019/0385233 A1 | 12/2019 | Claus |

FOREIGN PATENT DOCUMENTS

| | | |
|---|---|---|
| EP | 1081614 A2 | 3/2001 |
| EP | 1321870 A1 | 6/2003 |
| GB | 2366637 | 3/2002 |
| GB | 2389687 | 12/2003 |
| GB | 2411492 | 8/2005 |
| JP | 2003-524241 | 8/2001 |
| JP | 2002-007707 | 1/2002 |
| JP | 2002-007782 | 1/2002 |
| JP | 2002-063402 | 2/2002 |
| JP | 2002-133113 | 5/2002 |
| JP | 2002-183446 | 6/2002 |
| JP | 2002-197283 | 7/2002 |
| JP | 2002-203112 | 7/2002 |
| JP | 2002-230304 | 8/2002 |
| JP | 2002-259761 | 9/2002 |
| JP | 2002-269349 | 9/2002 |
| JP | 2002-542543 | 12/2002 |
| JP | 2003-058733 | 2/2003 |
| JP | 2003-058741 | 2/2003 |
| JP | 2003-515824 | 5/2003 |
| JP | 2003-522992 | 7/2003 |
| JP | 2003-525480 | 8/2003 |
| JP | 2003-331188 | 11/2003 |
| JP | 3493193 | 11/2003 |
| JP | 2003345987 | 12/2003 |
| JP | 2008050963 A | 10/2012 |
| JP | 2012156384 A | 11/2014 |
| WO | WO 95/006918 | 3/1995 |
| WO | WO 00/11587 | 3/2000 |
| WO | WO 00/26834 | 5/2000 |
| WO | WO 00/63814 | 10/2000 |
| WO | WO/2000/067172 | 11/2000 |
| WO | WO/2000/077670 | 12/2000 |
| WO | WO 01/04817 | 1/2001 |
| WO | WO 01/09757 | 2/2001 |
| WO | WO 01/25996 | 4/2001 |
| WO | WO-0142951 A2 | 6/2001 |
| WO | WO 01/48655 A1 | 7/2001 |
| WO | WO 01/52150 | 7/2001 |
| WO | WO 01/54037 | 7/2001 |
| WO | WO 01/55938 | 8/2001 |
| WO | WO/2001/055923 | 8/2001 |
| WO | WO 2001/057612 | 8/2001 |
| WO | WO 01/75752 | 10/2001 |
| WO | WO 01/77946 | 10/2001 |
| WO | WO 2001/088808 | 11/2001 |
| WO | WO 2001/093169 A1 | 12/2001 |
| WO | WO-0225398 A2 | 3/2002 |
| WO | WO 02/071297 A1 | 9/2002 |
| WO | WO 02/086657 A2 | 10/2002 |
| WO | WO 2003/001325 | 1/2003 |
| WO | WO 2004/008296 | 1/2004 |
| WO | WO 2004/008309 | 1/2004 |
| WO | WO 2004/68272 | 8/2004 |
| WO | WO 2005/083603 | 9/2005 |

(56) References Cited

FOREIGN PATENT DOCUMENTS

| WO | WO 2007/019404 | 2/2007 |
|---|---|---|
| WO | WO 2008/109224 | 9/2008 |

OTHER PUBLICATIONS

U.S. Appl. No. 60,706,109, filed Aug. 2005, Noviello.
Notification of Transmittal of International Search Report and Written Opinion for PCT Application No. PCT/US06/30636; dated Apr. 30, 2007; 8 pages.
European Patent Office Examination Report for Application No. 05712564.3-1238; dated Nov. 14, 2007 (5 pages).
European Patent Office Examination Report for Application No. 05712566.8-1238; dated Nov. 14, 2007 (5 pages).
Notification of Transmittal of International Search Report and Written Opinion for PCT Application No. PCT/US06/30638; dated Apr. 20, 2007 (8 pages).
Vergote, et. al. How to match Trades and Quotes for NYSE Stocks, Mar. 2005 (21 pages).
Notification of Transmittal of International Search Report and Written Opinion for PCT Application No. PCT/US05/03166; dated Nov. 4, 2005 (7 pages).
Notification of Transmittal of International Search Report and Written Opinion for PCT Application No. PCT/US05/03159; dated Feb. 24, 2006, (11 pages).
Notification of Transmittal of International Search Report and Written Opinion for PCT Application No. PCT/US05/03164; dated Dec. 13, 2006 (6 pages).
Notification of Transmittal of International Search Report and Written Opinion for PCT Application No. PCT/US05/03163; dated Jan. 4, 2007 (9 pages).
Zhongxing Ye, Yijun Zhang, Application of Genetic Algorithm Tooptimal Portfolio With Risk Control, vol. 1, pp. 351-354, Publishing House of Electron. Ind. (Beijing, China), 1995.
SEC.gov: Nasdaq Market Center Systems Description, Sep. 7, 2004, pp. 1-23 (Year: 2004).
InteractiveBrokers: Intermarket Sweep, Jun. 29, 2005, pp. 1-12 (Year: 2005).
Biais et al.: Imperfect Competition in Financial Market: Island vs NASDAQ, Nov. 2003, Carnegie Mellon University, pp. 1- 41. (Year: 2003).
NASDAQ: Top NASDAQ Participants, Jun. 2012, pp. 1-2. (Year: 2012).
Notification of Transmittal of International Search Report and Written Opinion for PCT Application No. PCT/US05/03168; dated Jan. 29, 2007 (6 pages).
Supplementary European Search Report for International Application No. PCT/US05/03166; dated Jan. 8, 2007 (3 pages).
Parlour, Christine, Price Dynamics in Limit Order Markets, Queens University, Kingston Ontario Canada, Nov. 1, 1995 (111 pages).
Weber, Bruce; Screen-Based Trading in Futures Markets: Recent Developments and Research Propositions, Abstract, ISBN 076950013, Jun. 21, 2005 (1 page).
Balance of Trade, Banking Technology, vol. 20, No. 9 ISSN 0266-0865, Nov. 1, 2004; pp. 42-44.
Supplementary European Search Report for Application No. 05712562. 7; dated Jul. 28, 2008 (2 pages).
Supplementary European Search Report for Application No. 05712563. 5; dated Jul. 28, 2008 (2 pages).
Australian Examiner's Report for AU Application No. 2006278384 dated Aug. 5, 2009 (3 pages).
Australian Examiner's Report for Application No. 2005208980, dated Nov. 17, 2009 (2 pages).
Australian Examiner's Report for Application No. 2005208978, dated Nov. 26, 2009 (1 page).
Australian Examiner's Report for Application No. 2005208981, dated Dec. 14, 2009 (3 pages).

George Simon & Kathryn Trikla, "The Regulation of Specialists and Implications for the Future," Business Lawyer, Nov. 2005, pp. 217-387.
The 'Hybrid Approach': A review of NYSE's Market Structure Proposal, Mondaq Business Briefing, NA, Dec. 9, 2004.
Australian Examiner's Report for Application No. 2006278382, dated Jul. 9, 2009 (3 pages).
New AZX Session, Trader's v10 n130, Oct. 1997, p. 4 (p. 20 of EIC search).
The New Trading Landscape for Institutional Investors, Institutional Trades Can Be Costly If Investors Aren't Careful, Norman Harris, Institutional Investor 36, 5, S1 (7) May 2002 (p. 21 of EIC search).
Scientific and Technical Information Center's Search Report EIC 3600, dated Jul. 9, 2009 (88 pages).
International Preliminary Report on Patentability for PCT Application No. PCT/US05/03164, dated Jan. 9, 2007 (4 pages).
Japanese Office Action with English translation for Application No. 2006-551589, dated Apr. 20, 2010 (6 pages).
International Preliminary Report on Patentability for PCT Application No. PCT/US05/03166, dated Jul. 31, 2006 (4 pages).
Japanese Office Action with English translation for Application No. 2006-551590, dated Apr. 20, 2010 (6 pages).
International Preliminary Report on Patentability for PCT Application No. PCT/US05/03163, dated Jan. 23, 2007 (5 pages).
Japanese Office Action with English translation for Application No. 2006-551588, dated Apr. 27, 2010 (8 pages).
International Preliminary Report on Patentability for PCT Application No. PCT/US05/03168, dated Feb. 13, 2007 (4 pages).
Japanese Office Action with English translation for Application No. 2006-551591, dated Apr. 20, 2010 (6 pages).
International Preliminary Report on Patentability for PCT Application No. PCT/US05/03159, dated Jul. 31, 2006 (6 pages).
Supplementary European Search Report for Application No. EP 05712558, dated Dec. 5, 2008 (2 pages).
Japanese Office Action with English translation for Application No. 2006-551587, dated Apr. 20, 2010 (6 pages).
International Preliminary Report on Patentability for PCT Application No. PCT/US06/30638, dated Feb. 5, 2008 (5 pages).
International Preliminary Report on Patentability for PCT Application No. PCT/US06/30636, dated Feb. 5, 2008 (5 pages).
Donald L. Luskin, Index Options & Futures: The Complete Guide, Toyo Keizai, Inc., Aug. 9, 1990, p. 32-35 [translation of an English book, originally published by John Wiley & Sons, Inc., 1987].
EPO: "Mitteilung des Europaischen Patentamts vom 1. Oct. 2007 Ober Geschaftsmethoden=Notice from the European Patent Office dated Oct. 1, 2007 concerning business methods=Communique de l'Office europeen des brevets,en date du 1er Oct. 2007, concernant les methodes dans le domaine des activites" Journal Officiel De L'Office Europeen Des Brevets.Official Journal of the European Patent Office.Amtsblattt Des Europaeischen Patentamts, OEB, Munchen, DE, vol. 30, No. 11, Nov. 1, 2007 (Nov. 1, 2007), pp. 592-593, XP0079055251SSN: 0170-9291 (2 pages).
European Patent Office Communication and Official Action for Application No. 05712562.7, dated May 18, 2010 (6 pages).
European Patent Office Communication and Official Action for Application No. 05712563.5, dated May 18, 2010 (6 pages).
European Patent Office Communication and Official Action for Application No. 05712558.5, dated May 18, 2010 (6 pages).
Australian Examiner's Report for Application No. 2005208979, dated Nov. 13, 2009 (2 pages).
European Patent Office Communication and Extended European Search Report for Application No. 06789488.1, dated Jul. 6, 2010 (10 pages).
European Patent Office Communication and Extended European Search Report for Application No. 06789490.7, dated Jul. 7, 2010 (8 pages).
Australian Examiner's Report for Application No. 2005208977, dated Nov. 20, 2009 (8 pages).
Japanese Office Action with English translation for Application No. 2006-551591, dated Aug. 24, 2010 (4 pages).
Japanese Office Action with English translation for Application No. 2006-551590, dated Aug. 24, 2010 (6 pages).

(56) References Cited

OTHER PUBLICATIONS

Daisuke Ochiai, "Electronic Finance and Security Trading, 'London Stock Exchange Transfers to New Trading System'", Capital Market Quarterly, Autumn 1997, vol. 1, No. 2, Nomura Research Institute, Nov. 1, 1997, pp. 102-108.
Japanese Office Action with English translation for Application No. 2006-551588, dated Aug. 31, 2010 (8 pages).
Japanese Office Action with English translation for Application No. 2006-551589, dated Aug. 31, 2010 (7 pages).
Australian Notice of Acceptance for Application No. 2005208980, dated Sep. 23, 2010 (3 pages).
Japanese Office Action with English translation for Application No. 2008-525266, dated Sep. 21, 2010 (7 pages).
Australian Notice of Acceptance for Application No. 2005208978, dated Nov. 30, 2010 (3 pages).
Australian Examiner's Report for Application No. 2005208977, dated Dec. 2, 2010 (1 page).
Japanese Office Action with English translation for Application No. 2008-525268, dated Nov. 24, 2010 (7 pages).
Australian Notice of Acceptance for Application No. 2005208981, dated Dec. 14, 2010 (3 pages).
Australian Notice of Acceptance for Application No. 2005208979, dated Dec. 20, 2010 (3 pages).
Japanese Office Action with English translation for Application No. 2006-551587, dated Nov. 24, 2010 (6 pages).
Japanese Office Action with English translation for Application No. 2006-551589, dated Dec. 7, 2010 (6 pages).
Japanese Office Action with English translation for Application No. 2006-551590, dated Jan. 11, 2011 (4 pages).
Japanese Office Action with English translation for Application No. 2006-551591, dated Jan. 11, 2011 (4 pages).
Australian Notice of Acceptance for Application No. 2006278382, dated Apr. 11, 2011 (3 pages).
Japanese Office Action with English translation for Application No. 2006-551588, dated Apr. 26, 2011 (6 pages).
Japanese Office Action with English translation for Application No. 2008-525268, dated Jun. 21, 2011 (4 pages).
Japanese Office Action with English translation for Application No. 2008-525266, dated Jun. 28, 2011 (7 pages).
Japanese Office Action with English translation for Application No. 2006-551587, dated Jul. 12, 2011 (6 pages).
Australian Notice of Acceptance for Application No. 2005208977, dated Aug. 24, 2011 (3 pages).
Lee, et. al., "R-Trader: An Automatic Stock Trading System Based on Reinforcement Learning," The British Library, pp. 785-794, (Abstract translated).
Tan, "Using genetic algorithm to optimize an oscillator-based market timing system," The British Library, pp. B115-B122.
Ye, et. al., Application of Genetic Algorithm to Optimal Portfolio with Risk Control,: The British Library, pp. 351-354.
Steiner, et. al., "Portfolio optimization with a neural network implementation of the coherent market hypothesis," The British Library, Elsevier Science B.V., pp. 27-40; rev. Nov. 11, 1995.
Lin, et. al., "The Applications of Genetic Algorithms in Stock Market Data Mining Optimisation," Faculty of Information Technology, University of Technology, 9 pages; 2000.
Fukutome, et. al., "Bidding market based on single price model with network constraints," IEEE, pp. 1245-1250 plus 4 pages; 2004.
Wachi, et. al., "Application for Single price auction model (SPA) in AC Network," pp. 81-89; 2005.
Wallman; Technology Takes to Securities TradingIIEE, Spectrum; pp. 60-65; Feb. 1997.
Schmerken; Cybercorp to Introduce Trading via CBOE; Wall Street & technology; coversheet plus p. 50; Jan. 2000.
Zeroual; An Open Distributed Request Propagation Approach for Trading Services; Proceedings of the Second International Conference on Machine Learning and Cybernetics, Xi'an; pp. 3253-3258; Nov. 2003.
International Search Report and the Written Opinion for International Application No. PCT/US06/22441; 5 pages; dated May 1, 2007.
International Search Report and the Written Opinion for International Application No. PCT/US07/07602; 5 pages; dated Sep. 24, 2007.
Hasbrouck et al.: Limit orders and volatility in a Hybrid Market: The Island ECN, Department of Finance, Stern School, NYU, Sep. 26, 2001, pp. 1-54.
Market Access Subcommittee: Best Practices for Organized Electronic Markets, Commodity Futures Trading Commission, Nov. 27, 2001, pp. 1-22.
Bongiovanni, et al.: Let's Play Hide-and-Seek: The Location and Size of Undisclosed Limit Order Volume, The Journal of Trading, Summer 2006, pp. 34-46.
European Communication and Supplementary Search Report for Application No. 06772668.7 dated Aug. 20, 2009; 5 pages; (this app has been Abandoned).
AU Examination Report for Application No. 2007201453 dated Jul. 30, 2010; 1 page.
AU Examination Report for Application No. 2006254819 dated Oct. 28, 2010; 2 pages.
European Communication and Search Report for Application No. 07754165.4 dated May 26, 2011; 9 pages.
Japanese Office Action with English translation for Application No. 2007-097157; dated Jun. 20, 2011 (4 pages).
NASDAQ: SuperMontage Release 1.0—Functional Description, Version 2.0, 2001, pp. 1-15.
Hendershott, T.: Electronic Trading in Financial Market, Jul./Aug. 2003, IT PRO, IEEE Computer Society, pp. 1-5.
Japanese Office Action with English translation for Application No. 2008-515959, dated Sep. 6, 2011 (6 pages).
Australian Examiner's Report for AU Application No. 2006278384 dated May 3, 2011 (2 pages).
Japanese Notice of Allowance for Application No. 2008-525268, dated Nov. 22, 2011 (3 pages).
International Preliminary Report for International Application No. PCT/US2006/022441, dated Dec. 11, 2007 (5 pages).
International Preliminary Report for International Application No. PCT/US2007/007602, dated Oct. 8, 2008 (5 pages).
Canadian Examination Report for 2,554,241 dated Aug. 6, 2012 (4 pages).
Canadian Examination Report for 2,554,244 dated May 16, 2012 (3 pages).
Canadian Examination Report for 2,554,179 dated Jan. 18, 2012 (3 pages).
Canadian Examination Report for 2,554,250 dated Jul. 30, 2012 (3 pages).
Canadian Examination Report for 2,554,468 dated Jul. 10, 2012 (6 pages).
Japanese Office Action with English translation for Application No. 2006-551587, dated Jan. 31, 2012 (9 pages).
Canadian Examination Report for 2,617,797 dated Feb. 14, 2012 (3 pages).
Canadian Examination Report for 2,617,787 dated Apr. 2, 2012 (4 pages).
Japanese Office Action with English translation for Application No. 2008-515959, dated Jul. 18, 2012 (9 pages).
European Examination Report for Application No. 07754165.4 dated Apr. 20, 2012 (7 pages).
Canadian Examination Report for 2,583,825 dated Oct. 18, 2012 (4 pages).
Japanese Office Action with English translation for Application No. 2006-551588, dated Nov. 14, 2012 (4 pages).
Japanese Office Action with English translation for Application No. 2006-551587, dated Oct. 2, 2012 (8 pages).
Australian Examiner's Report for AU Application No. 2011204904 dated Oct. 15, 2012 (3 pages).
Japanese Office Action with English translation for Application No. 2011-096192, dated Feb. 19, 2013 (6 pages).
Japanese Office Action with English translation for Application No. 2011-231889, dated Feb. 19, 2013 (7 pages).

(56) References Cited

OTHER PUBLICATIONS

Hong, et al., "Strategic Trading and Learning about Liquidity", 2002, Journal of Financial Markets 5, pp. 419-450.
Ayanian, et al., "The Search for Best Execution in Today's Market Environment", Jun. 6, 2002, Morgan Lewis Counselors at Law, pp. 1-18.
Canadian Examination Report for 2,609,200 dated Aug. 21, 2013 (4 pages).
Canadian Examination Report for 2,617,797 dated Oct. 17, 2013 (2 pages).
Japanese Office Action with English translation for Application No. 2011-231889, dated Sep. 3, 2013 (4 pages).
Canadian Examination Report for 2,554,179 dated Nov. 14, 2013 (3 pages).
Canadian Examination Report for 2,617,787 dated Nov. 22, 2013 (3 pages).
Australian Examiner's Report for AU Application No. 2012202466 dated Sep. 26, 2013 (2 pages).
Canadian Examination Report for 2,554,468, dated Nov. 26, 2013 (4 pages).
Australian Examination Report for 2012204120, dated Dec. 17, 2013, 3 pages.
Canadian Examination Report for 2,554,241 dated Mar. 10, 2014 (4 pages).
Canadian Examination Report for 2,554,244 dated Mar. 4, 2014 (4 pages).
Canadian Examination Report for 2,554,250 dated Feb. 18, 2014 (2 pages).
Australian Examination Report for 2011250751, dated Mar. 13, 2014, 3 pages.
Australian Examiner's Report for AU Application No. 2012207031 dated Feb. 12, 2014 (2 pages).
Canadian Examination Report for 2,583,825 dated Jan. 14, 2014 (4 pages).
Japanese Office Action with English translation for Application No. 2011-231889, dated Mar. 25, 2014 (4 pages).
Canadian Examination Report for 2,554,179 dated Mar. 10, 2015 (4 pages).
Canadian Examination Report for 2,554,250 dated Mar. 19, 2015 (8 pages).
Canadian Examination Report for 2,554,468, dated Feb. 11, 2015 (3 pages).
Canadian Examination Report for 2,617,797 dated Dec. 4, 2014 (4 pages).
Australian Examination Report for Application No. 2014203836 dated May 5, 2015 (6 pages).
Canadian Examination Report for Application No. 2,617,787 dated Mar. 26, 2015 (5 pages).
Canadian Examination Report for Application No. 2,609,200 dated Jul. 28, 2014 (5 pages).
Canadian Examination Report for Application No. 2,538,825 dated Jul. 26, 2017 (10 pages).
Canadian Final Action for Application No. 2,609,200 dated Sep. 18, 2017 (8 pages).
Notice of Allowance for CA Application No. 2554179; dated Feb. 5, 2018; 1 page.
Canadian Final Action for Application No. 2,554,241 dated Mar. 1, 2018 (10 pages).
Canadian Final Action for Application No. 2,554,244 dated Mar. 1, 2018 (8 pages).
Canadian Examination Report for 2,617,797 dated Apr. 26, 2016 (6 pages).
Australia First Examination Report for Application No. 2015203516 dated Sep. 7, 2016 (2 pages).
Canadian Final Action for 2617787 dated Sep. 23, 2016 (6 pages).
Australia First Examination Report for Application No. 2015268685 dated Sep. 21, 2016 (3 pages).
Canadian Examination Report for 2609200 dated Sep. 12, 2016 (6 pages).
Australia First Examination Report for Application No. 2015255245 dated Oct. 17, 2016 (3 pages).
Australia First Examination Report for Application No. 2015227416 dated Nov. 12, 2016 (3 pages).
Canadian Patent Appeal Board Action for 2617787 dated Mar. 13, 2017 ( 4 pages).
Canadian Notice of Allowance for 2554250 dated Mar. 22, 2017 ( 1 page).
Canadian Examiners Report for 2554468 dated Feb. 10, 2017 (6 pages).
Australia First Examination Report for Application No. 2016202851 dated Aug. 4, 2017 (3 pages).
Australia Second Examination Report for Application No. 2015203516 dated Aug. 4, 2017 (2 pages).
Australia Second Examination Report for Application No. 2015255245 dated Aug. 16, 2017 (3 pages).
Canadian Patent Appeal Office Action for 2609200 dated Apr. 27, 2018, (6 pages).
SEC.gov: Nasdaq Market Center Systems Desription, Sep. 7, 2004, pp. 1-23 (Year: 2004).
Australia First Examination Report for Application No. 2017258978 dated Dec. 13, 2018 (3 pages).
Canadian Examination Report for 2,554,179 dated Jul. 28, 2017 (3 pages).
Australian Examination Report for Application No. 2015268685 dated Aug. 30, 2017 (3 pages).
Australian Examination Report for Application No. 2015227416 dated Sep. 24, 2017 (4 pages).
Australian Examination Report for Application No. 2015227416 dated Nov. 9, 2017 (3 pages).
Patent Appeal Board Decision for Canadian Application No. 2,617,797 dated Nov. 21, 2017 (3 pages).
Lipson, Marc L.: Competition Among Market Centers, Dec. 2003, pp. 1-48. (Year: 2003).
Allen et al.: Electronic Trading and Its Implications for Financial Systems, Nov. 15, 2001, pp. 1-24. (Year: 2001).

* cited by examiner

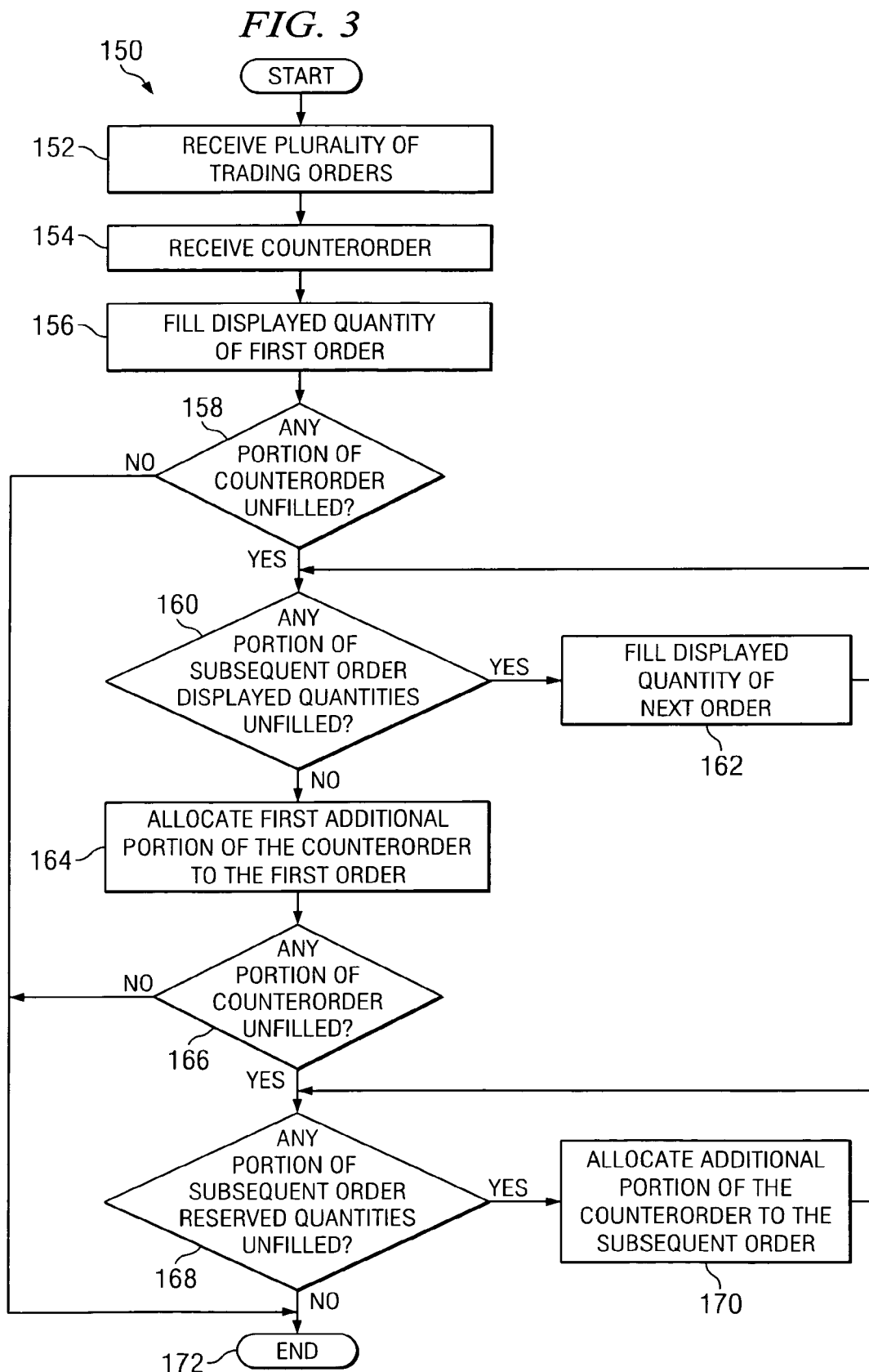

SYSTEM AND METHOD FOR APPORTIONING TRADING ORDERS BASED ON SIZE OF DISPLAYED QUANTITIES

RELATED APPLICATIONS

This patent application is a continuation application of U.S. patent application Ser. No. 13/936,789, filed Jul. 8, 2013 (now U.S. Pat. No. 10,395,310), which is a continuation of U.S. application Ser. No. 11/499,496 filed Aug. 3, 2006 (now U.S. Pat. No. 8,484,122), which claims priority from Patent Application Ser. No. 60/705,769, filed Aug. 4, 2005, entitled: System and Method for Apportioning Trading Orders Based on Size of Displayed Quantities, the disclosures of which are hereby incorporated by reference herein in their entireties.

TECHNICAL FIELD OF THE INVENTION

The present invention relates generally to electronic trading and more specifically to a system for apportioning trading orders based on size of displayed quantities.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

An apparatus for processing trading orders comprises a memory and a processor. The memory stores a first order and a second order. The first order is associated with a product and comprises a displayed quantity and a reserved quantity. The second order is associated with the product and comprises a displayed quantity and a reserved quantity. The processor is coupled to the memory and receives a counterorder associated with the product. The processor fills the displayed quantity of the first order with a corresponding portion of the counterorder, and fills the displayed quantity of the second order with a corresponding portion of the counterorder. The processor allocates a first additional portion of the counterorder to the first order. The first additional portion is based at least in part on a ratio of the displayed quantity of the first order to a sum of the displayed quantity of the first order and the displayed quantity of the second order.

Various embodiments of the present disclosure may benefit from numerous advantages. It should be noted that one or more embodiments may benefit from some, none, or all of the advantages discussed below.

One advantage is that the trading platform of the present system allocates counterorders to the reserved quantities of orders in proportion to the size of the displayed quantity of each order. As a result, the larger the displayed quantity of a particular order, the greater the number of shares allocated to the reserved quantity of that order from a counterorder. Accordingly, the system creates incentives for greater transparency in the marketplace by rewarding traders that display a larger portion of a given order. Greater transparency in the marketplace may lead to greater liquidity in the markets.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 3 illustrates a flowchart of an exemplary method for apportioning trading orders based on size of displayed quantities.

DETAILED DESCRIPTION OF THE INVENTION

Figure 1:
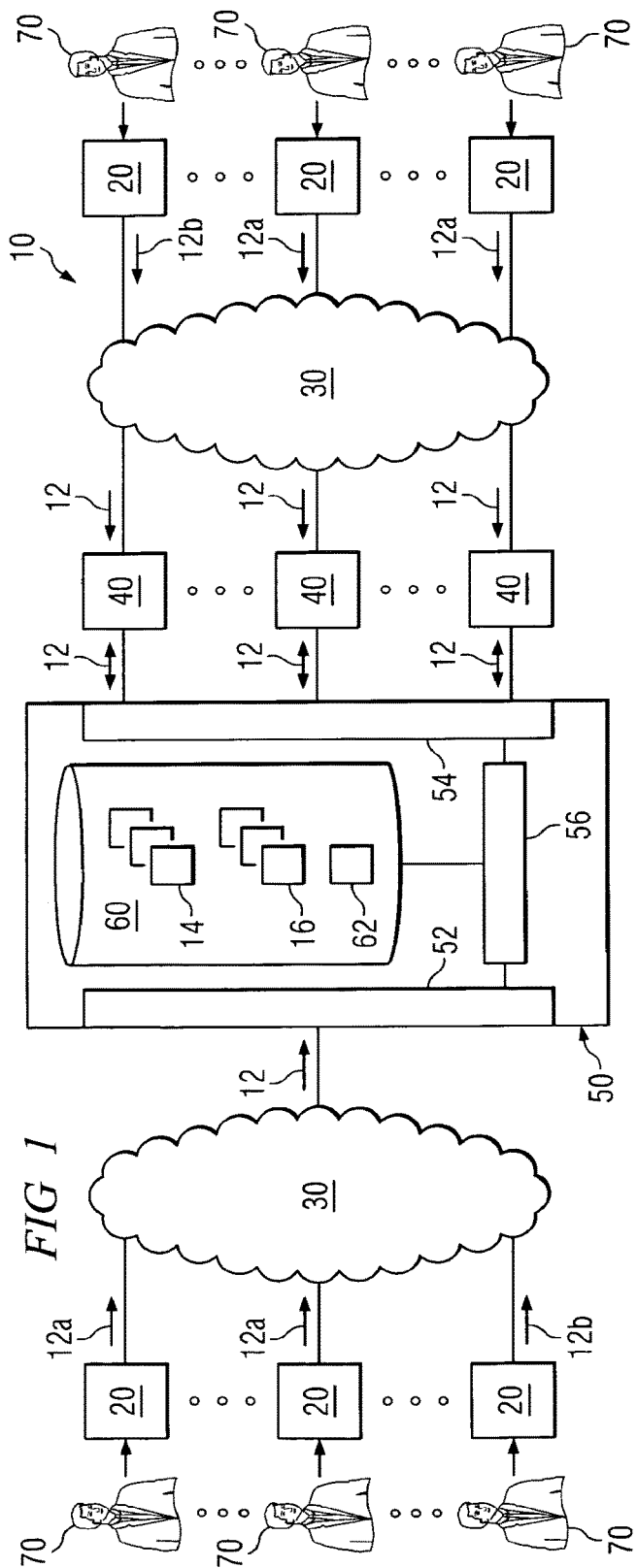
FIG. 1 illustrates one embodiment of a trading system in accordance with the present invention.

FIG. 1 illustrates one embodiment of a trading system 10. Generally, trading system 10 comprises a trading platform 50 communicatively connected to clients 20, networks 30, and market centers 40. Trading platform 50 may receive and process trading orders 12 from traders 70. By regulating the manner and sequence in which trading orders 12 are filled, trading platform 50 may create incentives for increased disclosure of trading orders 12.

A given trading order 12 may comprise two parts—a "displayed quantity" and a "reserved quantity." In placing trading order 12, trader 70 may indicate that only a portion of the total quantity of trading order 12 should be displayed to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while only displaying a portion of that trading order 12 to other traders 70. Trading platform 50 may incrementally fill a particular trading order 12 by first filling the displayed quantity of that trading order 12 and then using the reserved quantity to replenish the displayed quantity of that trading order 12.

Trading orders 12 generally comprise orders 12a and counterorders 12b. Orders 12a and counterorders 12b may be buy orders 14 and sell orders 16. Orders 12a and counterorders 12b are complementary actions such as, for example, buying and selling. If an order 12a refers to a buy order 14, then a counterorder 12b refers to a sell order 16.

Conversely, if an order 12a refers to a sell order 16, then a counterorder 12b refers to a buy order 14. A buy order 14 is a request to buy a particular quantity of a particular trading product (e.g., bid request). A sell order 16 is a request to sell a particular quantity of a particular trading product (e.g., offer request). In particular embodiments, trading order 12 may specify a target price (e.g., target bid price or target offer price) for the trading product. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Clients 20 are operable to receive trading orders 12 from traders 70 and to send trading orders 12 to trading platform 50 and/or market centers 40. Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keypad, keyboard, touch screen, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10.

According to certain embodiments, traders 70 may include market makers. A market maker may include any individual or firm that submits and/or maintains either or both bid and offer trading orders 12 simultaneously for the same instrument. For example, a market maker may include an individual or firm, such as a brokerage or bank, that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

Networks 30 are communication platforms operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may further comprise any combination of local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Different market centers 40 may have different policies regarding the disclosure of various details of trading orders 12. For example, certain market centers 40 referred to as "cooperative" market centers may disclose both the displayed quantities and the reserved quantities of trading orders 12 to trading platform 50. Other market centers 40 referred to as "non-cooperative" market centers may disclose only the displayed quantities of trading orders 12 to trading platform 50.

Trading platform 50 is a trading architecture that facilitates the routing, matching, and otherwise processing of trading orders 12. Trading platform 50 may comprise a management center or a headquartering office for any person, business, or entity that seeks to route, allocate, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Client interface 52 of trading platform 50 is communicatively connected to network 30 and supports communications between clients 20 and the various components of trading platform 50. According to certain embodiments, client interface 52 comprises a transaction server that receives trading orders 12 communicated by clients 20 via network 30.

Market interface 54 is communicatively connected to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 connected directly to trading platform 50.

Client interface 52 and market interface 54 are communicatively connected to processor 56. Processor 56 is operable to record trading orders 12 in memory module 60 and route trading orders 12 to market centers 40. Processor 56 is further operable to execute logic 62 stored in memory module 60 to match buy orders 14 and sell orders 16 received by client interface 52 and market interface 54. In addition, processor 56 is operable to incrementally fill a particular trading order 12 by using the reserved quantity of that trading order 12 to replenish the displayed quantity of that trading order 12. Processor 56 may comprise any suitable combination of hardware and software implemented in one or more modules to provide the described function or operation.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory module 60 as internal to trading platform 50, it should be understood that memory module 60 may be internal or external to components of trading system 10, depending on particular implementations. Also, memory module 60 illustrated in FIG. 1 may be separate or integral to other memory devices to achieve any suitable arrangement of memory devices for use in trading system 10.

According to certain embodiments, memory module 60 comprises logic 62. Generally, logic 62 comprises software instructions for routing, matching, processing, or filling trading orders 12. Processor 56 is operable to execute logic 62 in memory module 60 to match buy orders 14 and sell orders 16 and to determine the priority of traders 70 associated with those buy orders 14 and sell orders 16. Processor 56 is further operable to execute logic 62 in memory module 60 to determine the manner in which to replenish the displayed quantity of a particular trading order 12. Generally, the manner and sequence in which trading orders 12 are filled is based at least in part on the sequence in which trading platform 50 receives each trading order 12. In certain embodiments, the manner and sequence in which trading orders 12 are filled is also based at least in part on the size of the displayed quantity of a particular trading order 12 relative to the size of the reserved quantity of that trading order 12. By regulating the manner and sequence in which trading orders 12 are filled, trading platform 50 may create incentives for increased disclosure of trading orders 12.

It should be understood that the internal structure of trading platform 50 and the interfaces, processors, and memory devices associated therewith is malleable and can be readily changed, modified, rearranged, or reconfigured in order to achieve the intended operations of trading platform 50.

Trading platform 50 may process trading orders 12 according to logic 62 stored in memory module 60. Logic 62 may dictate the manner and sequence in which trading orders 12 are filled. According to certain embodiments, logic 62 may cause processor 56 to first fill the displayed quantities of trading orders 12 in chronological order. In some embodiments, logic 62 may then cause processor 56 to fill the reserved quantities of trading orders 12 in proportion to the size of the displayed quantity of each trading order 12.

Figure 2:
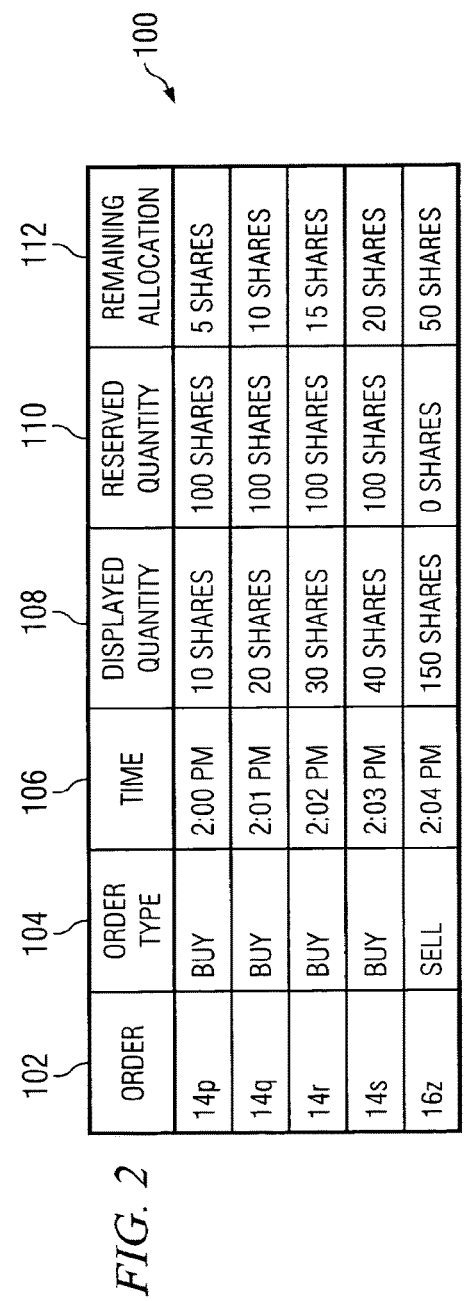
FIG. 2 illustrates one embodiment of trading information used by the system illustrated in FIG. 1.

FIG. 2 is a table 100 that sets forth an example illustrating certain embodiments of system 10. Trading platform 50 receives buy orders 14p, 14q, 14r, and 14s at 2:00 p.m., 2:01 p.m., 2:02 p.m., and 2:03 p.m., respectively, as illustrated in columns 102 and 106. Each buy order 14 is for shares of product A. Buy order 14p has a displayed quantity of 10 shares and a reserved quantity of 100 shares, as illustrated in columns 108 and 110, respectively. Buy order 14q has a displayed quantity of 20 shares and a reserved quantity of 100 shares. Buy order 14r has a displayed quantity of 30 shares and a reserved quantity of 100 shares. Buy order 14s has a displayed quantity of 40 shares and a reserved quantity of 100 shares. At 2:04 p.m., trading platform receives sell order 16z for 150 shares of product A. In the present example, logic 62 comprises a rule to first fill the displayed quantities of orders 12a in the sequence that trading platform 50 received those orders 12a. Accordingly, processor 56 first fills the displayed quantity of buy order 14p with 10 shares of product A from sell order 16z. Processor 56 next fills the displayed quantity of buy order 14q with 20 shares of product A from sell order 16z. Processor 56 then fills the displayed quantity of buy order 14r with 30 shares of product A from sell order 16z. Processor 56 next fills the displayed quantity of buy order 14s with 40 shares of product A from sell order 16z. At this point, the displayed quantities of all buy orders 14 have been filled and there are 50 remaining shares of product A from sell order 16z.

In the present example, logic 62 comprises a second rule. The second rule is to divide and allocate, once the displayed quantities of all orders 12a are filled, any remaining portion of counterorder 12b to orders 12a according to the ratio of the displayed quantity of a given order 12a to the displayed quantities of all orders 12a. In the present example, the displayed quantities of buy orders 14p, 14q, 14r, and 14s total 100 shares (e.g., 10+20+30+40=100). The displayed quantity of buy order 14p is 10% of the total displayed quantities of buy orders 14 (e.g., $10/100$=10%). Based on the second rule in logic 62, processor 56 allocates 10% of the remaining 50 shares of sell order 16z —5 shares—to the reserved quantity of buy order 14p, as illustrated in column 112. The displayed quantity of buy order 14q is 20% of the total displayed quantities of buy orders 14 (e.g., $20/100$=20%). Accordingly, processor 56 allocates 20% of the remaining 50 shares of sell order 16z —10 shares—to the reserved quantity of buy order 14q. The displayed quantity of buy order 14r is 30% of the total displayed quantities of buy orders 14 (e.g., $30/100$=30%). Accordingly, processor 56 allocates 30% of the remaining 50 shares of sell order 16z —15 shares—to the reserved quantity of buy order 14r. The displayed quantity of buy order 14s is 40% of the total displayed quantities of buy orders 14 (e.g., $40/100$=40%). Accordingly, processor 56 allocates 40% of the remaining 50 shares of sell order 16z —20 shares—to the reserved quantity of buy order 14s.

The preceding example illustrates one method for apportioning the remaining portion of counterorder 12b among orders 12a in proportion to the displayed quantity of each order 12a. According to other embodiments, the remaining portion of the counterorder 12b may be apportioned based on a fraction or a multiple of the percentage of the displayed quantity of each order 12a.

In some embodiments, in addition or as alternatives to the ratio of the displayed quantity of a given order 12a to the displayed quantities of all orders 12a, processor 56 may use other factors in allocating the remaining portion of counterorder 12b among orders 12a. According to certain embodiments, processor 56 may allocate the remaining portion of counterorder 12b based at least in part on the amount of time a particular order 12a has been in the order books prior to being filled. For example, an order 12a that has been in the order books for a long time may receive more of the remaining portion of counterorder 12b than another order 12a with the same displayed quantity that has not been in the order books for as long. In some embodiments, processor 56 may allocate the remaining portion of counterorder 12b based at least in part on the sequence in which orders 12a were received by trading platform 50. For example, the first order 12a may receive more of the remaining portion of counterorder 12b than another order 12a with the same displayed quantity as the first order 12a. In other embodiments, processor 56 may allocate the remaining portion of counterorder 12b based on any suitable number and combination of factors set forth above or hereinafter discovered (e.g., ratio of displayed quantity to reserved quantity; amount of time for order in order book; sequence that orders are received; etc.).

FIG. 3 is a flowchart 150 that illustrates one embodiment of a method for processing trading orders 12. It should be understood that additional, fewer, or different operations may be performed in any suitable order to achieve the intended functions without departing from the scope of this method. Trading platform 50 receives a plurality of trading orders 12a at step 152. Each trading order 12a is associated with a product and has a displayed quantity, and a reserved quantity. At step 154, platform 50 receives a counterorder 12b specifying a quantity for the product. Platform 50 fills the displayed quantity of the first order 12a with a quantity of the counterorder 12b at step 156 and determines whether any portion of the counterorder 12b remains unfilled at step 158. If not, execution terminates at step 172. If so, execution proceeds to step 160 where the platform 50 determines whether any portion of a displayed quantity for a subsequent order 12a remains unfilled. If so, execution proceeds to step 162 where platform 50 fills the displayed quantity of the next order 12a with a quantity of the counterorder 12b. Steps 160 and 162 are repeated until the answer to the question at step 160 is a negative response, at which point execution proceeds to step 164.

At step 164, platform 50 allocates a first additional portion of the counterorder 12b to the first order 12a, according to one or more factors described above (e.g., ratio of displayed quantity to reserved quantity; amount of time for order in order book; sequence that orders are received; etc.). Execution proceeds to step 166 where platform 50 determines whether any portion of the counterorder 12b remains unfilled. If not, execution terminates at step 172. If so, execution proceeds to step 168 where platform 50 determines whether any portion of the reserved quantity of a subsequent order 12a remains unfilled. If so, execution proceeds to step 170 where platform 50 allocates an additional portion of the counterorder 12b to the subsequent order 12a, according to one or more factors described above (e.g., ratio of displayed quantity to reserved quantity; amount of time for order in order book; sequence that orders are received; etc.). Steps 168 and 170 are repeated for each subsequent order 12a until step 168 is answered with a negative response, at which time execution terminates at step 172.

System 10 has certain technical advantages. Various embodiments of system 10 may have none, some, or all of these advantages. One advantage is that trading platform 50 allocates counterorder 12b to the reserved quantities of orders 12a in proportion to the size of the displayed quantity of each order 12a. As illustrated in the preceding example, the larger the displayed quantity of a particular order 12a, the greater the number of shares allocated to the reserved quantity of that order 12a from counterorder 12b. Accordingly, system 10 creates incentives for greater transparency in the marketplace by rewarding traders 70 that display a larger portion of a given order 12a. Greater transparency in the marketplace may lead to greater liquidity in the markets.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus comprising:
at least one processor configured to control:
receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded hut are not displayed to traders, in which the third order is received at the apparatus after the first order and the second order;
responsive to the first order and the second order being received, displaying, over the communication network, on a display of each of the first trader computer, the second trader computer and the third trader computer, the displayed quantity of the first order and the displayed quantity of the second order;
responsive to the third being received, refreshing, over the communication network, the display of each of the first, second and third trader computers, to display the displayed quantity of the first order and the displayed quantity of the second order with the displayed quantity of the third order;
receiving, over the communication network, from a fourth trader computer a counterorder associated with the product, the counterorder comprising a quantity;
filling at least the displayed quantity of the first order, the displayed quantity of the second order, and the displayed quantity of the third order with a portion of the counterorder;
determining that a remaining portion of the counterorder is unfilled;
determining a size of an additional portion of the counterorder from the remaining portion of the counterorder based at least in part on a first ratio that is equal to the displayed quantity of the first order divided by a sum of at least the displayed quantity of the first order, the displayed quantity of the second order, and the displayed quantity of the third order;
allocating the additional portion of the counterorder to the first order; and
determining a size of a further portion of the counterorder from the remaining portion of the counterorder based at least in part on a second ratio that is equal to the displayed quantity of the second order divided by the sum of at least the displayed quantity of the first order, the displayed quantity of the second order, and the displayed quantity of the third order.

2. The apparatus of claim 1,
wherein the at least one processor is configured to control determining a size of a still further portion of the counterorder from the remaining portion of the counterorder based at least in part on a third ratio that is equal to the displayed quantity of the third order divided by the sum of at least the displayed quantity of the first order, the displayed quantity of the second order, and the displayed quantity of the third order.

3. The apparatus of claim 1, wherein the first, second, and third orders comprise respective buy orders and the counterorder comprises a sell order.

4. The apparatus of claim 1, wherein the first, second, and third orders comprise respective sell orders and the counterorder comprises a buy order.

5. The apparatus of claim 1, wherein the filling at least the displayed quantity of the first order, the displayed quantity of the second order, and the displayed quantity of the third order with the portion of the counterorder comprises: filling at least the displayed quantity of the first order, the displayed quantity of the second order, and the displayed quantity of the third order with the portion of the counterorder in a same sequence that the first order, the second order, and the third order are received.

6. The apparatus of claim 2, wherein the at least one processor is configured to control:
allocating the further portion of the counterorder to the second order; and
allocating the still further portion of the counterorder to the third order.

7. The apparatus of claim 1, wherein the determining the size of the additional portion of the counterorder comprises determining the size of the additional portion of the counterorder from the remaining portion of the counterorder based at least in part, on another ratio that is equal to the displayed quantity of the first order divided by the reserved quantity of the first order.

8. The apparatus of claim 7, wherein the determining the size of the additional portion of the counterorder from the remaining portion of the counterorder further comprises: multiplying the remaining portion of the counterorder by the first ratio and the another ratio.

9. The apparatus of claim 2, wherein the allocating the additional portion of the counterorder to the first order comprises: after determining the size of the still further portion of the counterorder from the remaining portion of the counterorder, allocating the additional portion of the counterorder to the first order.

10. The apparatus of claim 1, wherein the receiving at least the first order, the second order, and the third order comprises: receiving the first order at a first time and the second order at a second time that is subsequent to the first time; and
wherein the at least one processor is configured to control:
determining another portion of the counterorder based at least in part on a difference between the first time and the second time; and
allocating the another portion of the counterorder to the first order.

11. The apparatus of claim 1, wherein the at least one processor is configured to control:
filling at least a portion of the reserved quantity of the first order with the additional portion of the counterorder.

12. The apparatus of claim 11, wherein the at least one processor is configured to control:
filling at least a portion of the reserved quantity of the second order with the further portion of the counterorder.

13. The apparatus of claim 1, Wherein the product comprises a financial instrument.

14. The apparatus of claim 1, wherein the determining the size of the additional portion of the counterorder from the remaining portion of the counterorder comprises: multiplying the remaining portion of the counterorder by the first ratio.

15. The apparatus of claim 1, wherein the determining the sire of the further portion of the counterorder from the remaining portion of the counterorder comprises: multiplying the remaining portion of the counterorder by the second ratio.

16. The apparatus of claim 15, wherein the first ratio and the second ratio are different values.

17. The apparatus of claim 1, wherein the at least one processor is configured to control:
determining another portion of the counterorder based at least in part on receiving the first order prior to receiving the third order; and
allocating the another portion of the counterorder to the first order.

18. The apparatus of claim 2, wherein a sum of the first, second, and third ratios is equal to one.

19. A method comprising:
controlling, by at least one processor:
receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded hut are not displayed to traders, in which the third order is received at the apparatus after the first order and the second order:
responsive to the first order and the second order being received, displaying, over the communication network, on a display of each of the first trader computer, the second trader computer and the third trader computer, the displayed quantity of the first order and the displayed quantity of the second order;
responsive to the third order being received, refreshing, over the communication network, the display of each of the first, second and third trader computers, to display the displayed quantity of the first order and the displayed quantity of the second order with the displayed quantity of the third order;
receiving, over the communication network, from a fourth trader computer a counterorder associated with the product, the counterorder comprising a quantity;
filling at least the displayed quantity of the first order, the displayed quantity of the second order, and the displayed quantity of the third order with a portion of the counterorder;
determining that a remaining portion of the counterorder is unfilled;
determining a size of an additional portion of the counterorder from the remaining portion of the counterorder based at least in part on a first ratio that is equal to the displayed quantity of the first order divided by a sum of at least the displayed quantity of the first order, the displayed quantity of the second order, and the displayed quantity of the third order;

allocating the additional portion of the counterorder to the first order; and determining a size of a further portion of the counterorder from the remaining portion of the counterorder based at least in part on a second ratio that is equal to the displayed quantity of the second order divided by the sum of at least the displayed quantity of the first order, the displayed quantity of the second order, and the displayed quantity of the third order.

20. A non-transitory storage medium on which is recorded instructions that, when executed by a computer, control:

receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded but are not displayed to traders, in which the third order is received at the apparatus after the first order and the second order;

responsive to the first order and the second order being received, displaying, over the communication network, on a display of each of the first trader computer, the second trader computer and the third trader computer, the displayed quantity of the first order and the displayed quantity of the second order;

responsive to the third order being received, refreshing, over the communication network, the display of each of the first, second and third trader computers, to display the displayed quantity of the first order and the displayed quantity of the second order with the displayed quantity of the third order;

receiving, over the communication network, from a fourth trader computer a counterorder associated with the product, the counterorder comprising a quantity;

filling at least the displayed quantity of the first order, the displayed quantity of the second order, and the displayed quantity of the third order with a portion of the counterorder;

determining that a remaining portion of the counterorder is unfilled;

determining a size of an additional portion of the counterorder from the remaining portion of the counterorder based at least in part on a first ratio that is equal to the displayed quantity of the first order divided by a sum of at least the displayed quantity of the first order, the displayed quantity of the second order, and the displayed quantity of the third order;

allocating the additional portion of the counterorder to the first order; and determining a size of a further portion of the counterorder from the remaining portion of the counterorder based at least in part on a second ratio that is equal to the displayed quantity of the second order divided by the sum of at least the displayed quantity of the first order, the displayed quantity of the second order, and the displayed quantity of the third order.

\* \* \* \* \*